(12) United States Patent
Nesselle et al.

(10) Patent No.: US 10,317,264 B1
(45) Date of Patent: Jun. 11, 2019

(54) AUTOMATIC TRIP TEST SIMULATOR

(71) Applicant: Tyco Fire Products LP, Lansdale, PA (US)

(72) Inventors: Robert S. Nesselle, Randolph, MA (US); Chad A. Goyette, Tiverton, RI (US)

(73) Assignee: Tyco Fire Products LP, Lansdale, PA (US)

( * ) Notice: Subject to any disclaimer, the term of this patent is extended or adjusted under 35 U.S.C. 154(b) by 621 days.

(21) Appl. No.: 14/817,909

(22) Filed: Aug. 4, 2015

Related U.S. Application Data

(60) Provisional application No. 62/032,923, filed on Aug. 4, 2014.

(51) Int. Cl.
*G01F 1/708* (2006.01)
*A62C 35/58* (2006.01)
*A62C 99/00* (2010.01)
*A62C 37/50* (2006.01)

(52) U.S. Cl.
CPC .............. *G01F 1/708* (2013.01); *A62C 35/58* (2013.01); *A62C 37/50* (2013.01); *A62C 99/009* (2013.01)

(58) Field of Classification Search
CPC ................................ A62C 37/50; G01F 1/708
See application file for complete search history.

(56) References Cited

U.S. PATENT DOCUMENTS

| | | | | | |
|---|---|---|---|---|---|
| 2,392,951 | A | * | 1/1946 | Salisbury | G01F 1/52 250/564 |
| 4,205,237 | A | * | 5/1980 | Miller | G01F 23/241 307/118 |
| 5,785,246 | A | * | 7/1998 | King | B05B 1/3033 239/101 |
| 2004/0100394 | A1 | * | 5/2004 | Hitt | A01G 25/167 340/870.11 |
| 2007/0221388 | A1 | * | 9/2007 | Johnson | A62C 35/58 169/16 |
| 2010/0237164 | A1 | * | 9/2010 | Noh | A01G 25/16 239/11 |
| 2014/0202714 | A1 | * | 7/2014 | Burkhart | A62C 35/62 169/9 |

FOREIGN PATENT DOCUMENTS

JP 08098985 A * 4/1996

* cited by examiner

*Primary Examiner* — Eric S. McCall
*Assistant Examiner* — Timothy P Graves
(74) *Attorney, Agent, or Firm* — Foley & Lardner LLP

(57) ABSTRACT

Systems and methods to measure fluid delivery times in a piping system and more particularly a dry pipe fire protection system. A device is provided that includes at least a solenoid valve for coupling to a network of pipes of a dry pipe sprinkler system and a liquid detector for coupling to the network of pipes to detect a flow of water in the network. A timer is coupled to the solenoid valve. Upon operation of the solenoid valve, the timer simultaneously initiates a start time of a fluid detection test. The timer is preferably coupled to the liquid detector such that upon the detector detecting water, the timer defines a stop time of the fluid detection test.

29 Claims, 7 Drawing Sheets

AUTOMATIC TRIP TEST SIMULATOR

PRIORITY DATA & INCORPORATION BY REFERENCE

This application claims the benefit of priority to U.S. Provisional Application No. 62/032,923 filed Aug. 4, 2014, which application is incorporated by reference in its entirety.

TECHNICAL FIELD

The present invention relates generally to fire protection devices and more specifically to equipment used in the installation and testing of fire protection systems that include a gas in its system piping in an unactuated state of the system, such as for example, dry pipe fire protection systems or preaction fire protection systems.

BACKGROUND ART

An exemplary fire protection sprinkler system for the protection of an occupancy, generally, includes a supply of water, a plurality of automatic fire protection sprinklers interconnected by a network of branch piping and a fluid control valve disposed between the water supply and the sprinklers to control the flow of water therebetween. Automatic sprinklers are, typically, fire suppression or control devices that operate automatically when its heat-activated element is heated to its thermal rating or above, allowing water to discharge over a specified area. The elevation and location of the sprinklers from the fluid control valve define at least the four most hydraulically remote sprinklers. "Hydraulically remote sprinklers" are those sprinklers that place the greatest water demand on a system in order to provide a prescribed minimum discharge pressure or flow. It is understood that a hydraulically remote sprinkler may not necessarily be those sprinklers that are physically located the furthest from the fluid supply or fluid control valve. The piping system is filled with a gas or air in an unactuated state of the system. The system includes an inspector's test connection ITC located outside the protected occupancy and downstream from a hydraulically remote sprinkler. One type of exemplary system is a "dry pipe sprinkler system" which is defined as a sprinkler system employing automatic sprinklers that are attached to a piping system containing air or nitrogen under pressure, the release of which (as from the opening of a sprinkler) permits the water pressure to open a valve known as a dry pipe valve, and the water then flows into the piping system and out the opened sprinklers. Another type of system that includes piping filled with a gas in its unactuated state is a "preaction sprinkler system," which employs automatic sprinklers that are attached to a piping system that contains air that might or might not be under pressure, with a supplemental detection system, such as for example, a heat or smoke detection system installed in the same area as the sprinklers.

Under fire protection industry standard, National Fire Protection Association (NFPA): *Standard for the Installation of Sprinkler Systems*, Section 7.2.3.6.1 (2013 ed.), dry pipe fire protection systems are required to deliver fluid to one or more hydraulically remote sprinklers within a requisite maximum time of water delivery based upon the hazard being protected. For example, a residential dwelling unit protected by a dry pipe system requires that the single most remote sprinklers have a fluid delivery time of 15 seconds.

A fluid delivery test can be conducted in order to verify the fluid delivery time of the system. Current manual test methods involve at least two people. One person is stationed outside the occupancy by an inspector's test connection ITC to open the test connection ITC to release air from the system. A second person is stationed by the control valve and waits for the valve to open once the air pressure within the piping system falls below a threshold value. With the two test personnel in communication with one another by, for example by radio, each person holds a stopwatch and coordinates their start at the moment the test connection ITC is opened and their stop at the moment of water delivery. Delivery of water is visually verified at the test connection ITC by the appearance of water at full flow from the test connection ITC. The time of operation of the fluid control valve is manually recorded. The elapsed time from start to stop defines the fluid delivery time. The problem with the current manual test methods is that they introduce test variability due to the human involvement in the test process. More specifically, requiring manual coordination between two handheld stopwatches introduces inaccuracies into the test results. Moreover, because the manual methods verify fluid delivery to the inspector's test connection, the current test methods fail to consider length of pipe from the remote sprinkler to the test connection ITC. These inaccuracies and/or the variables can be costly particularly where the system needs to be redesigned and/or reconstructed to satisfy a fluid delivery time as short as fifteen seconds. Accordingly, it is desirable to have test devices or methods that minimize or eliminate the inaccuracies.

DISCLOSURE OF INVENTION

The present invention is directed to a device to more accurately and consistently measure fluid delivery times in a piping system and more particularly a dry pipe fire protection system. The preferred device allows one person to measure water delivery time without introducing the previously described variables that impact the time result. The preferred device simulates an actuated sprinkler, the start of a timing clock, and the stopping of a timing clock upon detection of water proximate the simulated actuated sprinkler. In a preferred operation of the device, the test operator pushes a button that opens a solenoid valve and simultaneously starts a timer. As air discharges through the solenoid valve, a dry valve eventually trips and operates, and water travels towards the inspectors test port. Water reaches the outlet of the solenoid valve, the sensor detects water and triggers the timer to stop. The elapsed time on the timer defines the water delivery time.

A preferred trip test device includes means for simulating an actuated sprinkler in a network of pipes of a dry sprinkler system; means for detection of water in the network of pipes; and means for counting a unit of time being coupled to each of the simulating means and the detection means to determine a fluid delivery time of the system. The counting means defines the start time of the fluid delivery time upon operation of the simulating means and defines an end time of the fluid delivery time. One particular embodiment of a trip test device includes at least one solenoid valve for coupling to a network of pipes of a dry pipe sprinkler system; a liquid detector for coupling to the network of pipes to detect a flow of water in the network; and a timer coupled to the at least one solenoid valve. Upon operation of the solenoid valve, the timer simultaneously initiates a start time of a fluid detection test. The timer is preferably coupled to the liquid detector such that upon the detector detecting water in the pipes, the timer defines a stop time of the fluid detection test.

A preferred method of trip testing a dry pipe system is provided to determine a fluid delivery time. The preferred method includes simultaneously operating a timer and at least one solenoid valve proximate a sprinkler of the dry pipe sprinkler system; and simultaneously stopping the timer and detecting water with a detector proximate the sprinkler.

A preferred embodiment of a dry sprinkler system includes a water supply; a plurality of fire protection sprinklers interconnected by at least one branch line of piping; a fluid control valve controlling the flow of water from the supply to the plurality of fire protection sprinklers; and an inspector's test connection coupled to at least one of the fire protection sprinklers. A fluid delivery detection device having at least one simulation-detection subcomponent is coupled to the branch line proximate at least one sprinkler. The preferred fluid delivery detection device includes a timer-initiating sub-component to simultaneously initiate operation of the simulation-detection subcomponent and a counter of the timer-initiating component.

Although the Summary of the Invention and the preferred systems and methods can provide for determining fluid delivery time in a fire protection system to a hydraulically remote sprinkler or ITC, it is to be understood that the preferred systems and method can be more generally used to determine fluid flow between two points in a piping network. The Summary of the Invention is provided as a general introduction to some embodiments of the invention, and is not intended to be limiting to any particular configuration or system. It is to be understood that various features and configurations of features described in the Summary of the Invention can be combined in any suitable way to form any number of embodiments of the invention. Some additional preferred embodiments including variations and alternative configurations are provided herein.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
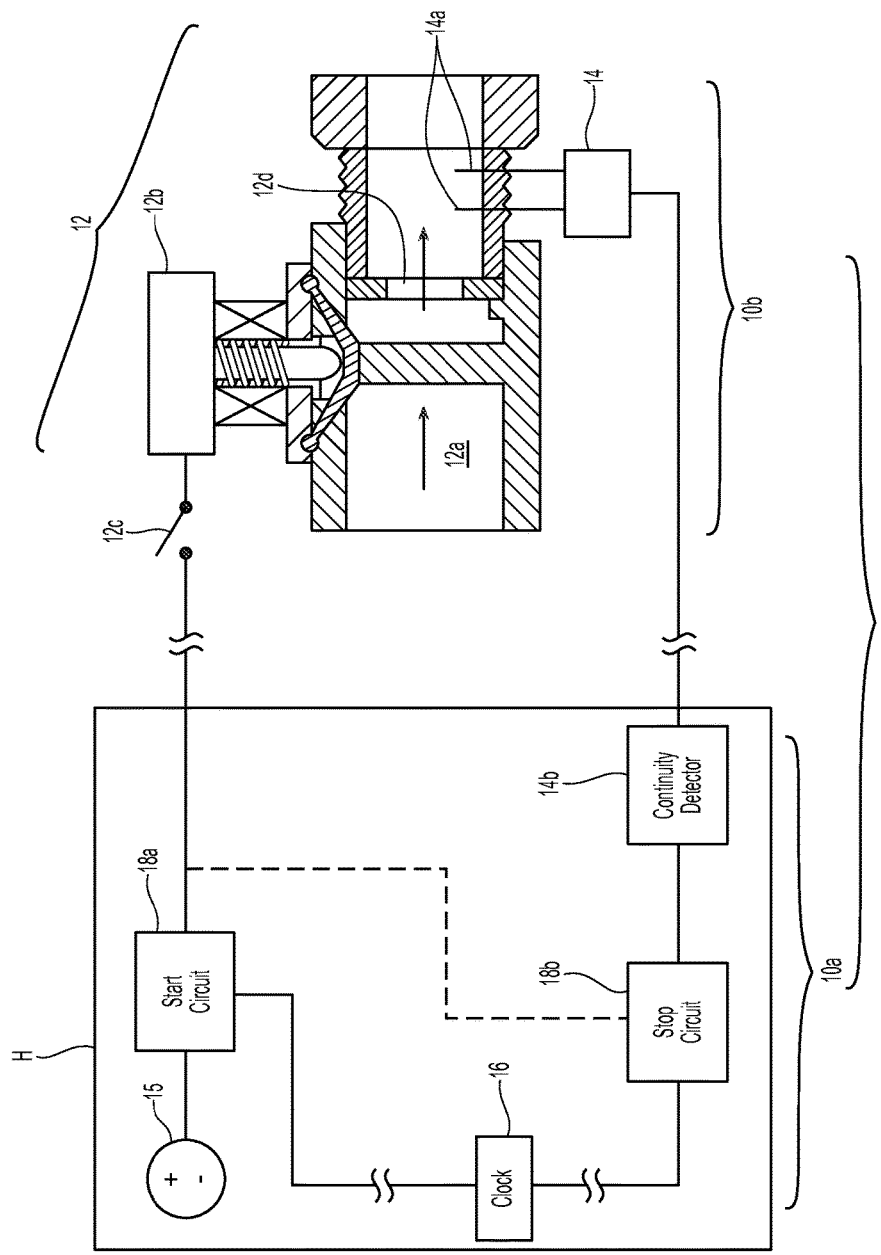
FIG. 1 schematically shows a preferred embodiment of a device for determining the delivery time of a fluid in a piping system.
Figure 1A:
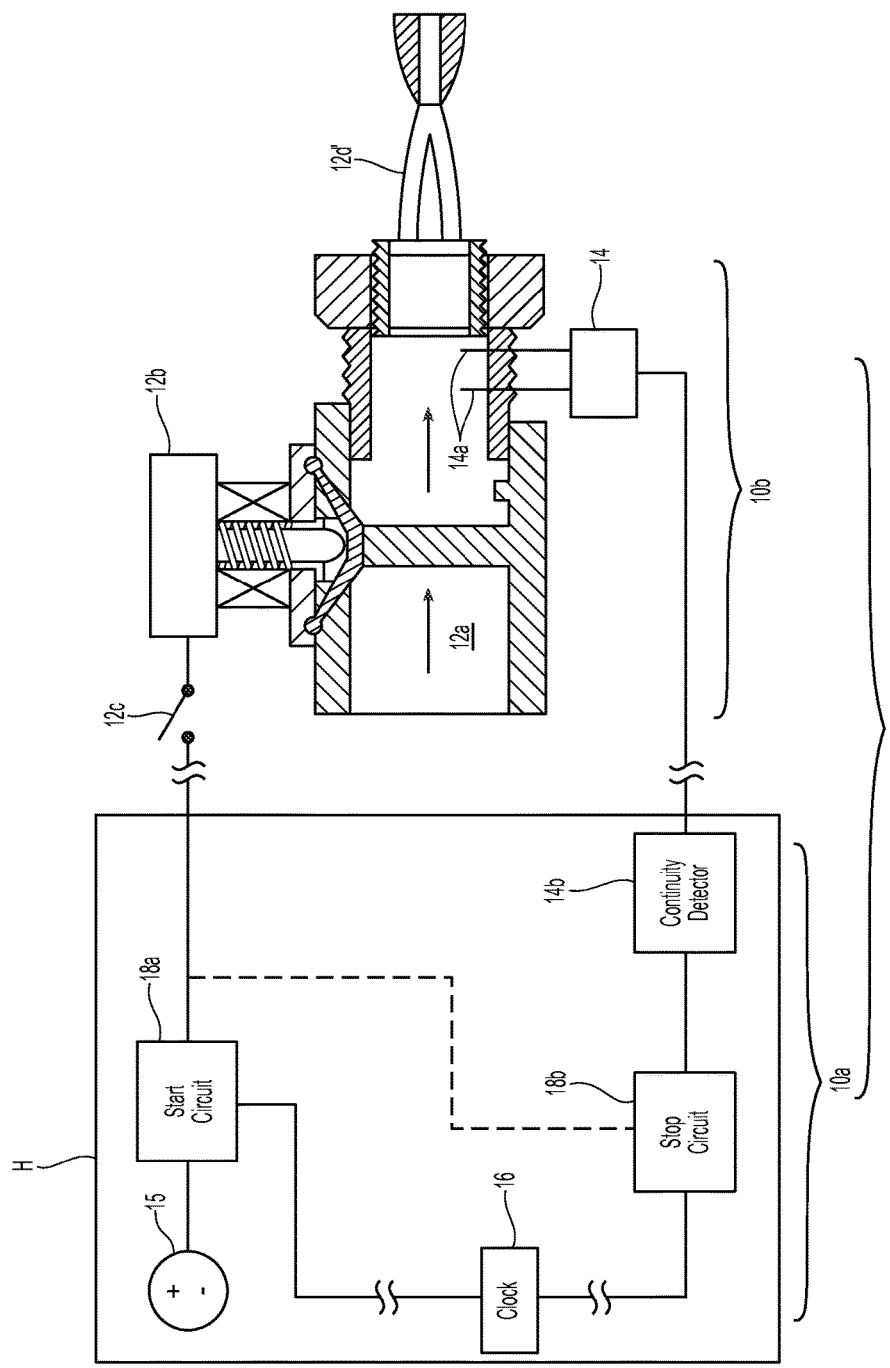
FIG. 1A schematically shows another preferred embodiment of the device for determining the delivery time of a fluid in a piping system.

Shown in FIGS. 1 and 1A are preferred embodiments of a device 10 for determining a time to delivery of fluid from a fluid source to a location in a piping system. The device 10 is preferably suited for performing a fluid delivery time test, e.g., a trip test of a dry sprinkler system and more particularly performing a fluid delivery time test in a dry pipe fire protection system by a single operator or user in accordance with the applicable industry accepted standards. The device 10 simulates an actuated sprinkler to permit the compressed air or other gas in the system to escape in order to operate the system fluid control valve, i.e., dry pipe valve, and fill the system piping with water or other fighting fluid. The device 10 detects the delivery or presence of fluid at a desired location, for example, a desired location within a fire protection piping system. The device 10 also determines the elapsed time between the moment of simulated sprinkler actuation and the moment of fluid delivery to the desired point within the piping system.

Figure 2:
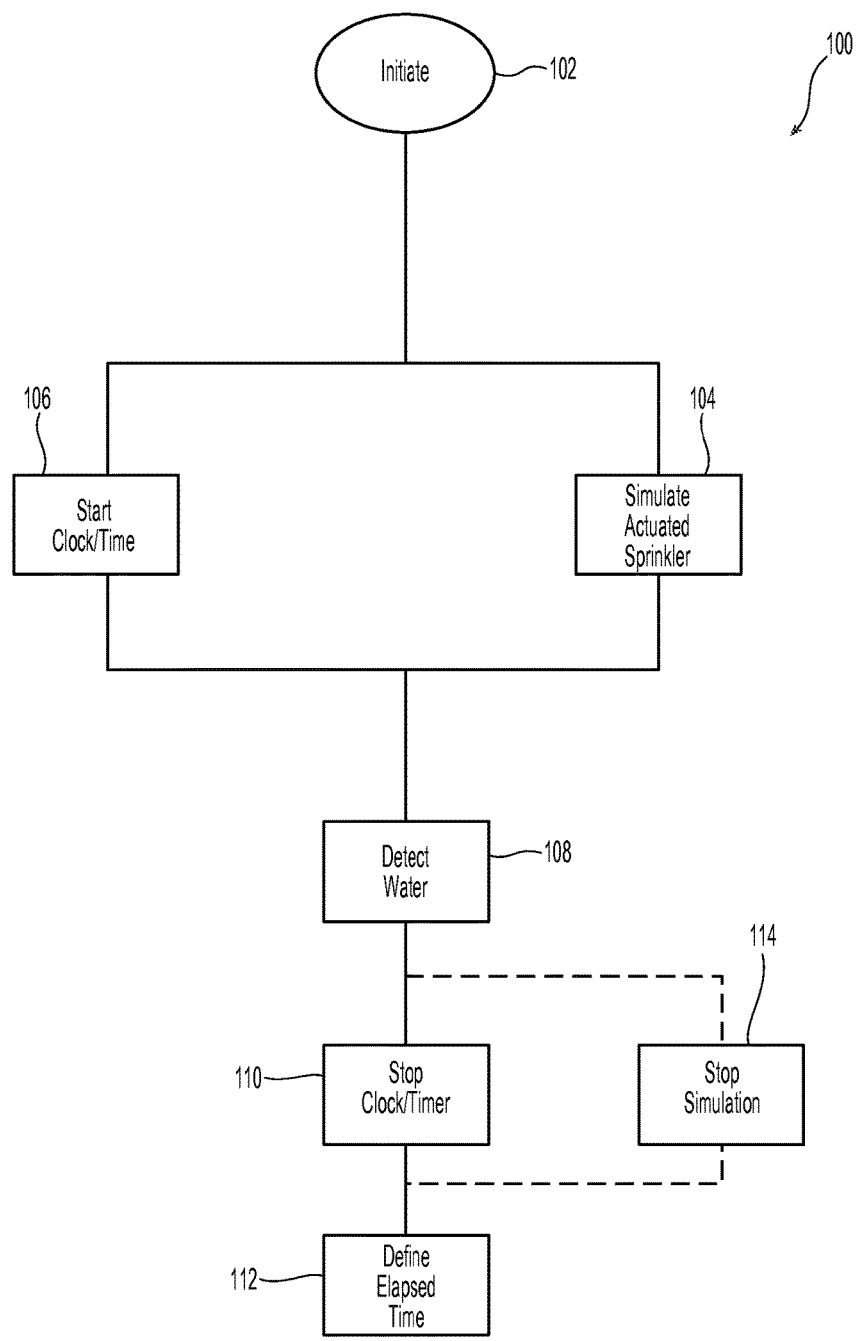
FIG. 2 is a preferred method of operation for the device of FIGS. 1 and 1A.

The preferred device 10 includes means for simulating an actuated sprinkler 12 and means for detecting of water or other fluid 14. The device 10 further includes means for timing and/or counting 16 the time between the simulated actuation and the detection of fluid. The timing means 16 is preferably coupled to each of the simulating means 12 and detection means 14 to define a preferred operation of the device 10. Shown in FIG. 2 is a preferred method 100 of operating the device 10. The timing means 16 is coupled to the simulation means 12 such that the initiation 102 of the timing means 16 preferably simultaneously operates the simulation means 12 and starts the counter 104, 106 to define a start time for fluid detection at the moment of simulated sprinkler actuation. The timing means 16 is further preferably coupled to the detection means 14 such that at the moment of fluid detection 108 by the detection means 14, the timing means 16 simultaneously ceases counting 110 to define the moment of fluid detection and more particularly define the elapsed time 112 between sprinkler actuation to the moment of fluid delivery. In one preferred embodiment of operation of the device 10, the simulation means 12 and detection means 14 are coupled together such that at the moment of fluid detection the simulation means 12 ceases simulation 114 of an open sprinkler. Alternatively the simulation means 12 and detection means 14 are coupled together such that the simulation means 12 ceases simulation 114 of an open sprinkler following a period of delay after the moment of fluid detection.

Referring again to FIG. 1 and the preferred embodiment of the device 10, the simulation means is preferably embodied as an electrically operated solenoid valve 12 for coupling to a piping network or other pipe fitting. An exemplary valve for use in the device 10 includes a 12 volt water solenoid electric valve normally closed two-way for water, gas or oil. Another exemplary valve 12 for use in the device 10 is an 18-24 volt one-inch pilot actuated solenoid valve. Generally, the solenoid valve 12 includes an internal passageway 12*a* or conduit through which a fluid, gas or liquid, may flow. The electrical operation of the solenoid valve 12 simulates the thermally actuated response of an automatic sprinkler to a fire by opening the passageway 12*a* in response to an appropriate electrical actuating signal to permit the flow of a fluid. Flow through the passageway 12*a* can be controlled by a solenoid 12*b* which operates an internal plunger and diaphragm against an internal seat to selectively close and open the passageway 12*a* for the passage of fluid. The open or closed state of the passageway 12a is dependent upon the energized state of the solenoid 12b. For example, the solenoid valve 12 and its passageway 12a is preferably normally closed in a de-energized state of the solenoid 12b to prevent the flow of fluid through the passageway 12a. Once an appropriate electrical signal, current or voltage, is delivered to the solenoid, the passageway is opened to permit the flow of fluid through its internal passageway 12a. The solenoid valve 12 preferably includes a solenoid switch 12c to selectively control the electrical signal from, for example a voltage source 15, to the solenoid 12b to selectively control the state of the valve 12 and its passageway 12a.

Additionally, the valve 12 simulates the internal flow or discharge characteristics of the sprinkler being simulated. A sprinkler's discharge characteristics can be identified by a nominal K-factor which is defined as an average flow of water in gallons per minute through the internal passageway divided by a square root of pressure of water fed into the inlet end of the internal passageway in pounds per square inch gauge: $Q=K\sqrt{P}$ where P represents the pressure of water fed into the inlet end of the internal passageway through the body of the sprinkler, in pounds per square inch gauge (psig); Q represents the flow of water from the outlet end of the internal passageway through the body of the sprinkler, in gallons per minute (gpm); and K represents the nominal K-factor constant in units of gallons per minute divided by the square root of pressure expressed in psig. Known nominal K-factors include (with the K-factor range shown in parenthesis): (i) 14.0 (13.5-14.5) GPM/(PSI)$^{1/2}$; (ii) 16.8 (16.0-17.6) GPM/(PSI)$^{1/2}$; (iii) 19.6 (18.6-20.6) GPM/(PSI)$^{1/2}$; (iv) 22.4 (21.3-23.5) GPM/(PSI)$^{1/2}$; (v) 25.2 (23.9-26.5) GPM/(PSI)$^{1/2}$; (vi) 28.0 (26.6-29.4) GPM/(PSI)$^{1/2}$; and (vii) 33.6 (31.9-35.28) GPM/(PSI)$^{1/2}$. Other nominal K-factors smaller and larger than those specifically listed can be simulated. For example, discharge K-factors for a residential-type sprinkler can be simulated, which can include nominal K-factors of any one of (i) 1.4 GPM/(PSI)$^{1/2}$; (ii) 1.9 GPM/(PSI)$^{1/2}$; (iii) 2.8 GPM/(PSI)$^{1/2}$; and (iv) 4.2 GPM/(PSI)$^{1/2}$.

For the solenoid valve 12, the internal passageway 12a is defined by an inlet, an outlet with the passageway extending therebetween. Preferably proximate the outlet is an internal orifice member or disc 12d to define the discharge characteristics of the solenoid valve 12 and simulate the discharge characteristics of a fire protection sprinkler. The orifice member 12d can be located or positioned within the passageway by a threaded bushing threaded into the outlet of the solenoid valve 12. The internal orifice is preferably interchangeable so that the solenoid valve 12 can simulate a variety of fire protection sprinklers. Accordingly, the internal orifice 12d can be interchanged to vary the outlet of the solenoid valve to define a desired nominal K-Factor. Alternatively and more preferably, an open sprinkler frame can be coupled to the solenoid valve 12 to simulate an open sprinkler of a desire discharge characteristic. As schematically illustrated in FIG. 1A, the open sprinkler frame 12d' can be threaded into the threaded bushing.

A preferred embodiment of the detection means is embodied as a liquid and more preferably a water detection detector or sensor 14. A preferred embodiment of the detector 14 is a two contact continuity sensor to detect the presence of water or other liquid by detecting the continuity between two leads, conductors or prongs 14a in contact with the liquid. In the presence of water or liquid, the two conductors are placed in continuity with one another change state, operate and/or de-energize another component of the device 10, such as for example, the solenoid valve 12 or the timing means 16. In a preferred embodiment of the device 10, the water detector includes a pair of spaced apart probes 14a preferably mounted proximate the outlet of the solenoid valve. More preferably, the probes 14a are mounted to project laterally into the threaded bushing that is threaded into the outlet of the solenoid valve 12.

Figure 3:
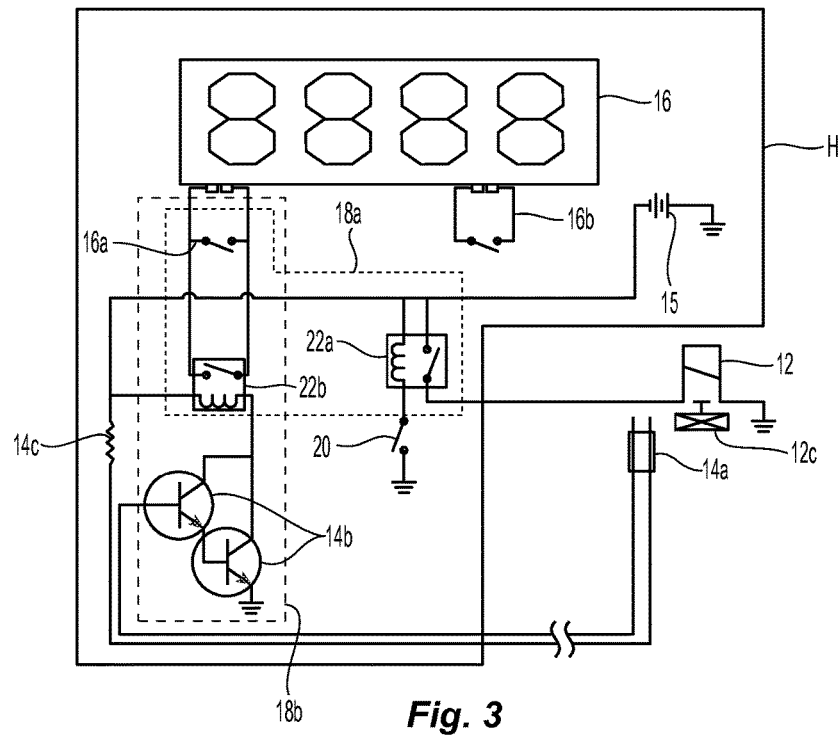
FIG. 3 schematically shows a preferred embodiment of the device of FIGS. 1 and 1A.
Figure 4:
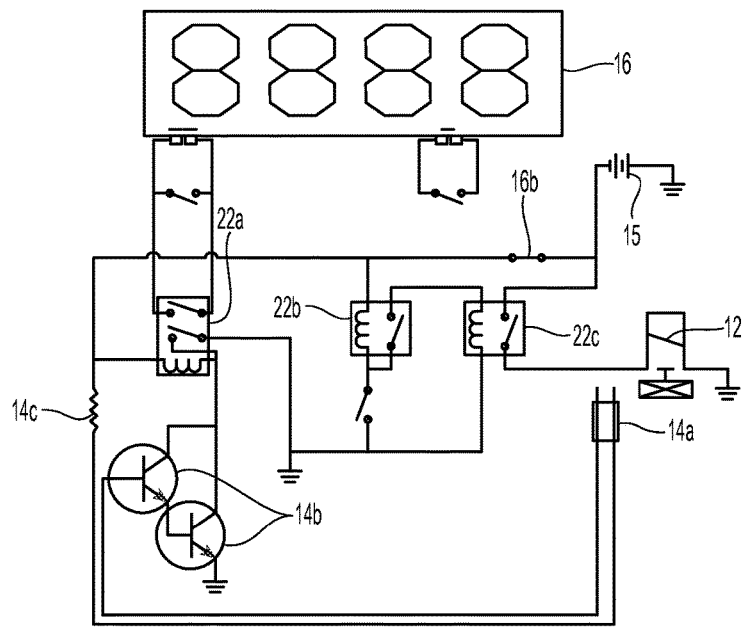
FIG. 4 schematically shows another preferred embodiment of the device of FIGS. 1 and 1A.
Figure 4A:
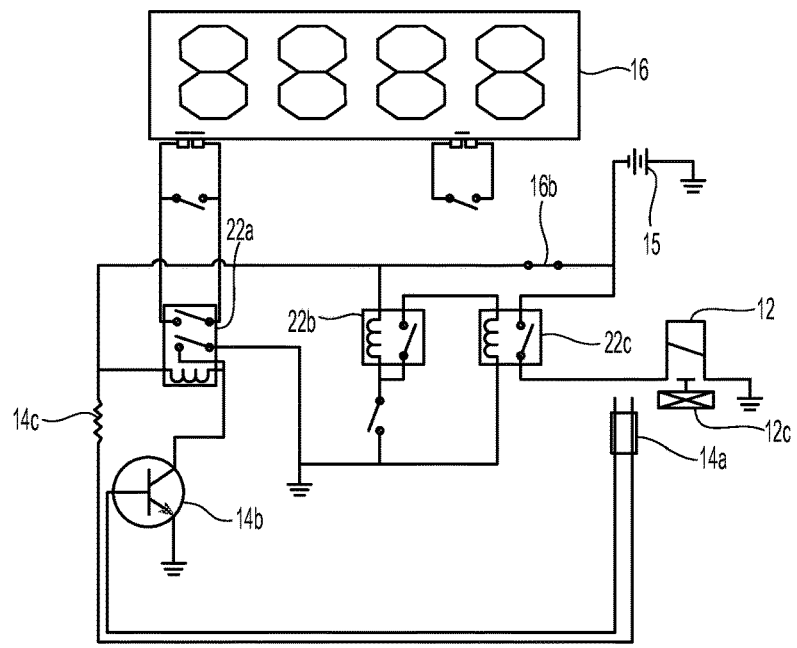
FIG. 4A schematically shows another preferred embodiment of the device of FIGS. 1 and 1A.
Figure 4B:
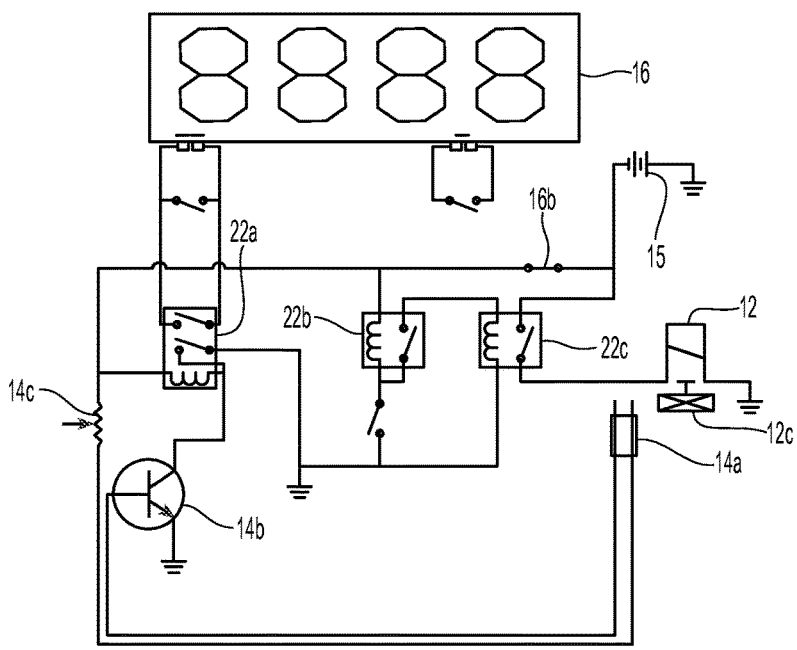
FIG. 4B schematically shows another preferred embodiment of the device of FIGS. 1 and 1A.

The liquid detector 14 further preferably includes a continuity tester 14b for determining the continuity between the two probes 14a in the presence of water or other liquid. Referring to FIGS. 3 and 4, the continuity tester 14b includes at least one transistor and preferably includes two transistors to more preferably define a "Darlington Pair." In an alternate embodiment as shown in FIGS. 4A and 4B, the continuity tester 14b more preferably includes a single transistor. The sensitivity of the detector 14 can be defined by a resistor 14c of a fixed resistance, as seen in FIGS. 3, 4 and 4A; or alternatively, more preferably the sensitivity defined by a resistor of a variable resistance as seen in FIG. 4B. The sensitivity of the detector 14 is preferably set such that the sensor detects liquid in the presence of a minimal amount of liquid flow but not in the presence of moisture.

The preferred timing means is preferably embodied as a timer counter 16 to measure a duration or elapse of time between operation of the solenoid valve 12 and the detection of liquid or water by the detector 14. The preferred timer counter 16 measures time in incremental units of one second or a fraction thereof. More preferably, the timing counter 16 can count by fractions of the second and more particularly at least by $\frac{1}{100}$ths of a second. The timer counter 16 can additionally count at an interval of a micro-second and can count up to several hundreds of hours provided the timing means can count at the one second intervals and fractions thereof. An exemplary embodiment of the timing counter 16 is the Laureate™ Digital Stopwatch and Timer from Laurel Electronics, Inc. of Costa Mesa, Calif. The preferred stopwatch timer counter 16 can be initiated or halted by an appropriate electrical signal and preferably by an appropriate pulse signal. In the preferred device 10, the timer counter 16 can initiate counting by a push button, toggle switch or other manual device coupled to a power supply to deliver the appropriate initiating electrical signal.

Referring again to FIG. 1, the timer counter 16 is preferably coupled to the solenoid valve 12 by a preferred start circuit 18a so that an initiating signal substantially simultaneously initiates the timer counter 16 and operates the solenoid valve 12 to initiate simulation of sprinkler operation. Moreover, the timer counter 16 is preferably coupled to the liquid detector 14 by a preferred stop circuit 18b such that upon detecting the presence of liquid, the generated continuity detection signal of the detector 14 can halt the count of the timer counter 16 to define the time lapse from simulated actuation to liquid detection. The solenoid valve 12 can remain open after halting the counter 16 to permit liquid to continue to flow from the solenoid valve. In one alternate embodiment, the stop circuit 18b is coupled to the solenoid valve 12 such that upon the detection of liquid by the sensor 14, the stop circuit 18b preferably opens the solenoid switch 12c to change the state of the solenoid 12b and close the solenoid valve 12. Further in the alternative, the time at which the solenoid 12 closes can be delayed to a time after liquid detection to still permit full liquid or water flow from the solenoid valve 12.

Shown in FIG. 3 is a schematic arrangement of the device 10 showing preferred embodiments of the start and stop circuits 18a, 18b to couple the solenoid valve 12, water detector 14 and timer counter 16. The start circuit 18a includes an initiating switch 20 that is preferably configured as a normally open push-button. The start circuit 18a further preferably includes a first relay 22a which couples the initiating switch 20 and power or voltage source 15 to the solenoid switch 12c of the solenoid valve 12. Upon depressing the initiating switch or button 20, the first relay 22 changes state to close the solenoid switch 12c, energize the solenoid 12b and open the solenoid valve 12. The start circuit 18a includes a second relay 22b which couples the initiating switch 20 and power or voltage source 15 to the first relay 22a and timer counter 16. Upon depressing the initiating button 20, which changes the state of the first relay 22a, the state of the second relay 22b is substantially simultaneously changed to start the timer counter 16 to determine the elapsed time to liquid detection.

The preferred stop circuit 18b includes the second relay 22b coupled to the liquid detector 14 and the timer counter 16. With the timer counter 16 counting the time from operation of the solenoid valve 12, the second relay 22b is in an operative state. Once the detector 14 detects the presence of water, the continuity test circuit 14b of the preferred detector changes the state of the second relay 22b from its operative state to its initial state. Given the preferred coupled arrangement between the second relay 22b and the timer counter 16, the return of the second relay 22b to its initial state preferably opens a switch to halt the timer counter 16 to define the time to liquid detection and the elapsed time to liquid detection. The stop circuit 18b is further preferably coupled to the timer counter 16 so that once the detector 14 detects liquid and stops the timer counter 16, the timer counter 16 and/or first relay 18a must be reset in order start counting again. Accordingly, in a preferred embodiment of the stop circuit 18b and the second relay 22b, the relay is preferably a double-pole relay with a wired latching loop so as to reset the relay and the timer. The device 10 further preferably includes a reset 16b to manually reset each of the first and second relay 22a, 22b. Alternatively or additionally, the detection circuit 14b can be coupled to either the first relay 22a, the solenoid valve 12 or both so that upon detection of liquid, the solenoid valve 12 is returned to its normally closed state. Further in the alternative, the circuit can include or be configured with an appropriate delay to close the solenoid valve 12 after a delay period following detection of liquid.

The reset 16b can be coupled to any additional relays to reset the relay to an initial state. For example, shown in FIG. 4 is another preferred embodiment of the device 10 and start circuit 18'. The alternate start circuit includes a third relay 22c coupled to the solenoid switch 12c and the first relay 22a such that closing the solenoid switch changes the state of the second relay to maintain the solenoid switch 12c closed and the solenoid valve 12 energized open without necessarily needing to keep the initiating switch 20 depressed or engaged. The device 10 and its preferred reset 16b to reset the first and third relays 22a, 22c to their initial state.

Referring again to FIG. 1, the timer counter 16 and initiator push-button 20 can be disposed with a housing H along with the starter and stop circuits 18a, 18b and preferred water continuity circuit 14b to provide a first timer-initiator sub-component or box 10a of the device 10. The power source 15 of the system 10 can be embodied as a battery mounted within the housing H. In one preferred embodiment, the device 10 includes a low battery indicator (not shown). The solenoid valve 12 and detection probe 14a are preferably coupled together by a threaded bushing in a manner previously described to provide a preferred simulator-detection sub-component 10b of the device 10. The prior embodiments of the device 10 are shown and described with a single preferred solenoid valve and water detection probe assembly 12, 14a or single preferred simulator-detection sub-component 10b coupled to a single timer-initiator sub-component or box 10a. However in alternate embodiments, multiple solenoid valves and detection probes can be coupled to one initiator and one or more timer counters so as to provide for a testing device with two or more simulator-detection sub-components 10b coupled to a single timer-initiator sub-component 10a as described in greater detail below.

Alternatively to the previously described circuitry, the timer-initiator 10a, including the stop continuity tester 14b, timer counter 16 and stop circuit 18 and the overall functions of the device 10, as seen for example in FIG. 2, can be embodied in a microcontroller. More specifically, a microcontroller can be configured and programmed to operate with an appropriate user interface and display, such as a control station, computer, smart phone application or tablet, etc.) to generate an initiating signal simulating an actuated sprinkler and determining and displaying the elapsed time between sprinkler actuation and fluid delivery. For example, a microcontroller can be configured and programmed to generate an initiating signal upon depression of a push button in a wireless mobile application or app by a user or operator. The initiating signal can begin an internal timer and close a start circuit to operate a solenoid valve 12 as previously described. Once the water detector means or other sensor 14 detects fluid, an analog signal is generated from the sensor 14 for input to the microcontroller. Appropriate analog-digital conversion can be applied to ensure input and output of signals to and from the microcontroller. The microcontroller performs appropriate comparative analysis to determine that fluid was detected or some other threshold was appropriately exceeded to determine fluid detection. The microcontroller, in response, generates another appropriate output signal to stop the internal timer and record its reading. The second signal can also close the solenoid valve or signal an operator or user to close the solenoid valve 12. The determined elapsed time can then be displayed to the user. One advantage of the using the microcontroller is that the microcontroller can be appropriately programmed to work with other sensors or sensors.

Figure 5A:
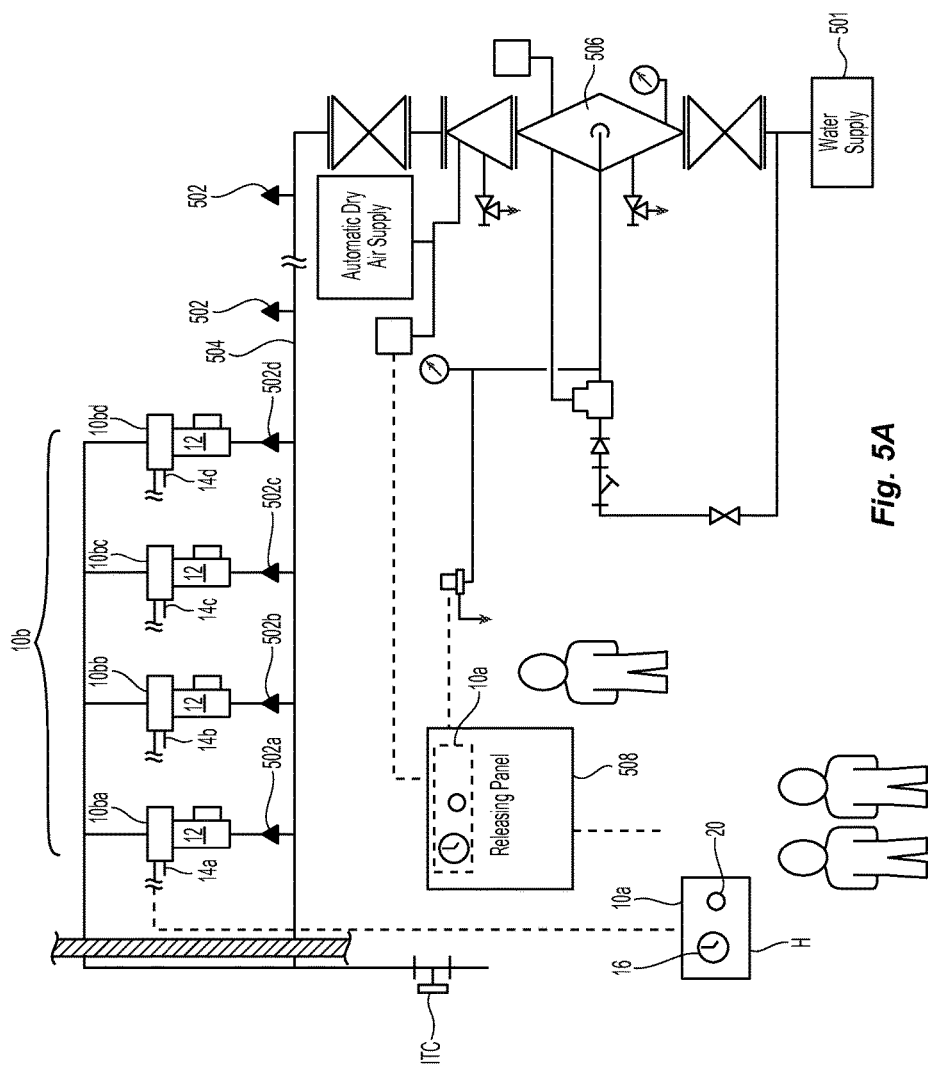
FIG. 5A schematically shows permanent system installations of the device of FIGS. 1 and 1A.

The device 10 is suited for a single operator or user to perform a trip test in a dry fire protection system in which the device 10 can simulate an open sprinkler, simultaneously start a timer or counter, and stop the timer upon detecting water delivery at a desired location within the piping system. Shown in FIG. 5A, is a preferred permanent installation in which an assembled simulator-detection sub-component 10b is coupled to a network of sprinklers of an exemplary dry pipe fire protection system 500. It should be understood that the device 10 can be used to determine a fluid delivery time in other systems that are initially filled with a gas in an unactuated state of the system such as for example, preaction sprinkler systems. Generally, the system 500 includes a supply of water, a plurality of fire protection sprinklers 502 interconnected by a network of branch piping 504 and a fluid control valve 506 disposed between the water supply and the sprinklers to control the flow of water therebetween. The system includes an inspector's test connection ITC preferably located outside the occupancy being protected. The simulator-detector subcomponent 10b is preferably located proximate one of the sprinklers 502 above the inspector's test connection ITC.

In the preferred installation, the assembled simulator-detection sub-component 10b is coupled to a first fire protection sprinkler 502a in the network of sprinklers. The inlet of the solenoid valve 12 can be coupled to a Tee-fitting joining the sprinkler 502a to a branch line 504 of the system 500. The solenoid valve 12 preferably includes an internal orifice 12d that defines a nominal K-factor of the sprinkler 502a. With the preferred bushing and radially mounted detection probe 14a threaded into the outlet of the solenoid valve 12, the exposed end of the bushing is preferably coupled to the piping leading to the inspector's test connection ITC.

The timer-initiating component 10a is wired or wirelessly coupled to the simulator-detection sub-component 10b to conduct a trip test. In operation and with the inspector's test connection ITC open, the operator depresses the initiating push-button 20 to simultaneously open the solenoid valve 12 and initiate the counter timer 16 in a preferred manner as previously described. With the solenoid valve 12 open, compressed gas within the system pipes is permitted to escape through solenoid valve 12 and the inspector's test connection ITC. When a sufficient amount of air escapes through the solenoid valve 12, the dry pipe valve 506 opens and permits water to fill the system piping. Water flows through the system, toward and through the open solenoid valve 12. The flowing water is detected by the water detector 14 and its probe 14a to indicate water delivery proximate the first sprinkler 502a. The sensitivity of the water detector 14 preferably detects water at a minimal flow but not in the presence of moisture or condensation. Accordingly, the water detector 14 preferably does not require water flow at full operating pressure of the system 500. The water flow can be permitted to discharge from the inspector's test connection ITC or other discharge location for visual confirmation. With the continuity detected at the probe 14a, the detector 14 and stop circuit 18b substantially simultaneously halt the timer counter 16. The elapsed time indicated by the timer counter 16 is the fluid delivery time.

Alternatively or in addition to, the device 10 includes multiple simulator-detection sub-components 10ba-10bd to simulate multiple actuated sprinklers. Each of the simulator-detection sub-components 10aa-10ad are respectively coupled to a fire protection sprinkler 502a-502d. If the timer-initiating component 10a includes a sufficient number of timer counters or memory, the time of fluid delivery can be determined for each simulator-detection sub-component 10aa-10ad. Further in the alternative, the simulator-detection sub-component 10b can more preferably include one solenoid valve and liquid detector assembly 12, 14 and three electrically operated solenoid valves respectively coupled to the four fire protection sprinklers 502a, 502b, 502c, 502d without a water detection probe 14a or other detection means. Accordingly, the sole liquid detector 14 would detect the delivery of water preferably proximate the first sprinkler 502a. The four solenoid valves 12 can be operated simultaneously to simulate the simultaneous operation of up to four sprinklers or they may be alternatively sequenced to simulate a sequential operation of the sprinklers 502a-502d. Simultaneous actuation of the solenoid valves can be provided by identifying one solenoid valve 12 as the master solenoid valve coupled directly to the timer-initiator sub-component 10a. The other solenoid valves can serve as follower valves electrically coupled to the master in a manner to provide for sequential actuation. The solenoid valves 12 and/or detector 14 assemblies can be connected to sprinklers along the same branch line or alternatively be connected to sprinklers on different branch lines in the piping network.

The installation of the simulator-detection subcomponent 10b shown in FIG. 5A preferably provides for a permanent installation. The solenoid valve 12 preferably includes the internal orifice 12d disc member that simulates a desired nominal K-factor of the system. The timer-initiator sub-component 10a can be embodied as a portable unit housed in device housing H. The portable timer-initiator sub-component 10a can be brought to the inspector's test connection ITC by the test operator and/or the Authority Having Jurisdiction to run the fluid delivery test. Alternatively, the timer-counter 16 and initiating switch or button 20 can be incorporated into a mounted control panel, such as for example, a releasing panel 508 that is mounted near the system riser.

Figure 5B:
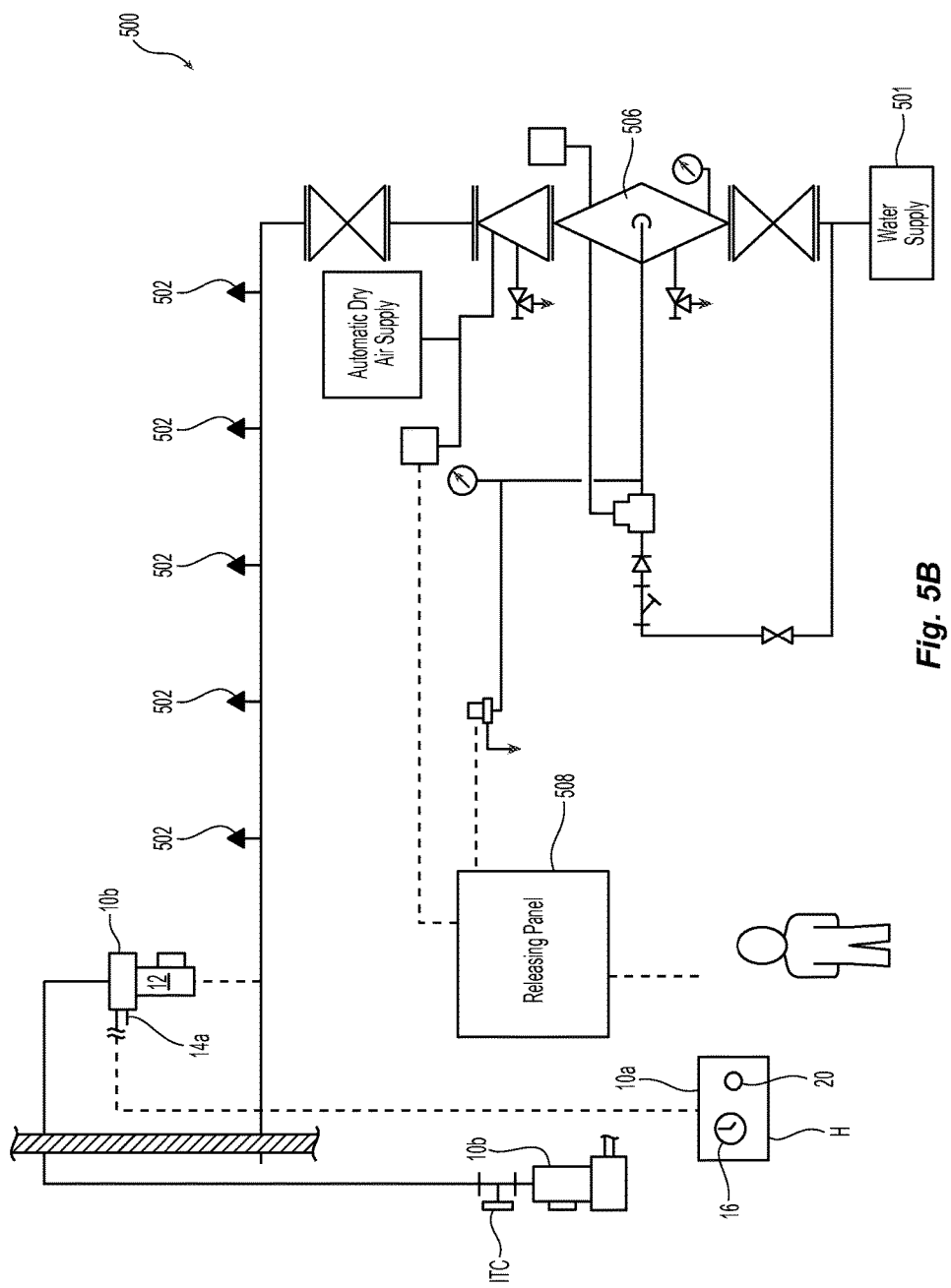
FIG. 5B schematically shows a temporary system installation of the device of FIGS. 1 and 1A.

Alternatively, the device 10 can be used in a temporary installation in FIG. 5B. For example, one or more simulator-detection subcomponents 10b, e.g., solenoid valve and water detection probe assemblies 12, 14 can be temporarily replace an installed sprinkler 502. The temporarily installed solenoid valve 12 preferably includes an open sprinkler frame 12d', as seen in FIG. 1A, that simulates a nominal K-factor of a temporarily replaced sprinkler 502a. With the simulator-detection subcomponents 10b installed, the fluid delivery test can be conducted in a manner as previously described. Further in the alternative, a simulator-detection subcomponent 10b can be temporarily coupled at the inspector's test connection ITC. In such an installation, the length of piping from the sprinkler to the inspector's test connection ITC should be accounted for in the fluid delivery time.

A preferred embodiment of the device 10 was tested by determining the fluid delivery time in a test system that includes a four inch differential fluid pressure valve, with system air pressure at 25 pounds per square inch (psi.) and a water supply pressure of 70 psi. Five consecutive test were conducted. It was determined that the fluid delivery time varied by deviation of 0.5 seconds.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A trip test device comprising:
   at least one solenoid valve for coupling to a network of pipes of a dry pipe sprinkler system;
   a liquid detector for coupling to the network of pipes to detect a flow of water in the network; and
   a timer coupled to the at least one solenoid valve such that upon the solenoid valve changing to an open state, the timer starts a counter to define a start time of a fluid detection test, the timer being coupled to the liquid detector such that upon the detector detecting water in the pipes, the timer stops the counter to define a stop time of the fluid detection test to define an elapsed time of the fluid detection test as a difference between the start time and the stop time.

2. The device of claim 1, wherein the liquid detector is coupled to the solenoid valve such that upon the detector detecting water, the solenoid valve is simultaneously closed.

3. The device of claim 1, wherein the liquid detector is coupled to the solenoid valve such that upon the detector detecting water, the solenoid valve is closed after a delay following detecting water.

4. The device of claim 1, wherein the timer includes a start circuit for starting the timer and a stop circuit for stopping the timer, the start circuit being coupled to the at least one solenoid valve such that an energizing signal that energizes the solenoid to open substantially simultaneously initiates the start circuit to start the timer, the stop circuit being coupled to the liquid detector such that a detection signal from the liquid detector stops the timer.

5. The device of claim 4, wherein the start circuit includes at least a first relay defining an initial state and an initiating switch coupled to the first relay, the first relay being coupled to the solenoid valve and the timer such that closing the initiating switch changes the state of the first relay to substantially operate the solenoid valve and start the timer.

6. The device of claim 5, wherein the start circuit includes a second relay having an initial state, the second relay coupling the first relay to the timer.

7. The device of claim 6, wherein the initiating switch is a push-button and the start circuit includes a third relay having an initial state, the third relay being coupled to the first relay such that depressing the initiating push-button changes the state of the second relay to maintain the solenoid valve energized open upon release of the initiating push-button.

8. The device of claim 7, further comprising a reset switch coupled to each of the first, second and third relays to reset the timer and close the solenoid valve.

9. The device of claim 6, wherein the liquid detector includes a continuity stop circuit that includes a relay defining an initial state, the relay of the stop circuit being coupled to the liquid detector and the timer such that a detection signal changes the state of the relay to stop the timer.

10. The device of claim 4, wherein a relay of the stop circuit is a double-pole relay with a wired latching loop to reset the relay and the timer.

11. The device of claim 1, wherein the liquid detector includes a pair of spaced apart probes and a continuity tester for determining the continuity between the two probes in the presence of water.

12. The device of claim 11, wherein the continuity tester includes at least one transistor.

13. The device of claim 11, wherein the continuity tester consists of one transistor.

14. The device of claim 11, wherein the liquid detector includes a variable resistor coupled to control the sensitivity of the liquid detector.

15. The device of claim 1, wherein a fluid delivery time is measured to 1/100th of a second.

16. The device of claim 1, wherein the at least one solenoid valve includes at least four solenoid valves coupled to one another, one of the at least four solenoid valves being coupled to the timer, the other three solenoid valves being coupled to the one solenoid valve such that when the one solenoid valve operates, the three solenoid valves operate.

17. The device of claim 1, wherein the at least one solenoid valve includes an interchangeable orifice to simulate the orifice of a sprinkler of the dry pipe sprinkler system.

18. The device of claim 1, wherein the timer is wirelessly coupled to each of the solenoid valve and liquid detector.

19. A trip test device comprising:
means for simulating an actuated sprinkler in a network of pipes of a dry sprinkler system;
means for detection of water in the network of pipes; and
means for counting a unit of time being coupled to each of the simulating means and the detection means to determine a fluid delivery time of the system, the counting means starting upon the simulating means changing to an open state to define a start time of the fluid delivery time, and the counting means stopping upon the detection means detecting water in the network of pipes to define an end time of the fluid delivery time to define an elapsed time of a fluid detection test as a difference between the start time and the stop time.

20. The device of claim 19, wherein the means of simulating comprises an electrically operated solenoid valve.

21. The device of claim 19, wherein the means of detection comprises a two conductor probe and a continuity circuit.

22. The device of claim 19, wherein the means of counting comprises an electrically operated stopwatch.

23. A sprinkler system comprising:
a water supply;
a plurality of fire protection sprinklers interconnected by at least one branch line of piping;
a fluid control valve controlling the flow of water from the supply to the plurality of fire protection sprinklers;
an inspector's test connection coupled to at least one of the fire protection sprinklers; and
a fluid delivery detection device having at least one simulation-detection subcomponent coupled to the at least one branch line of piping proximate at least one sprinkler and a timer-initiating sub-component to simultaneously initiate operation of the simulation-detection subcomponent and a counter of the timer-initiating component, the simulation-detection subcomponent comprises an electrically operated solenoid valve and a two-conductor water probe having a continuity circuit.

24. The system of claim 23, wherein the probe is coupled to a solenoid valve by a bushing threaded into the outlet of the solenoid valve, the probe being mounted to the bushing.

25. The system of claim 23, wherein the timer-initiating sub-component includes a timer coupled to each of a start circuit and a stop circuit, the start circuit being coupled to the solenoid valve and the stop circuit being coupled to the probe.

26. The system of claim 23, wherein the fluid delivery detection device includes a plurality of simulation-detection subcomponents.

27. The system of claim 23, wherein the at least one simulation-detection subcomponent is coupled to one of the plurality of sprinklers by a tee fitting.

28. The system of claim 23, wherein the at least one simulation-detection subcomponent is coupled to the at least one branch line so as to temporarily replace one of the plurality of sprinkler.

29. The system of claim 23, wherein the system is any one of a dry pipe sprinkler system and a preaction sprinkler system.

* * * * *